United States Patent
Lu (10) Patent No.: US 10,114,163 B1
(45) Date of Patent: Oct. 30, 2018

(54) OPTICAL COMPONENT WITH IMAGE COMPENSATION

(71) Applicant: TAIWAN FIBER OPTICS, INC., Taipei (TW)

(72) Inventor: Luke Lu, Taipei (TW)

(73) Assignee: TAIWAN FIBER OPTICS, INC., Taipei (TW)

( * ) Notice: Subject to any disclaimer, the term of this patent is extended or adjusted under 35 U.S.C. 154(b) by 0 days.

(21) Appl. No.: 15/905,940

(22) Filed: Feb. 27, 2018

(51) Int. Cl.
*F21V 8/00* (2006.01)
*G02B 6/04* (2006.01)

(52) U.S. Cl.
CPC ......... *G02B 6/0008* (2013.01); *G02B 6/0006* (2013.01); *G02B 6/04* (2013.01)

(58) Field of Classification Search
CPC ...... G02B 6/0006; G02B 6/0008; G02B 6/04; G02B 6/06; G02B 6/08; F21V 8/00
See application file for complete search history.

(56) References Cited

U.S. PATENT DOCUMENTS

| 7,773,849 B2 * | 8/2010 | Shani | G02B 6/10 385/131 |
| 2010/0238090 A1 * | 9/2010 | Pomerantz et al. | G09G 5/00 345/1.3 |
| 2013/0148933 A1 * | 6/2013 | Eberle et al. | G02B 6/04 385/116 |
| 2015/0043876 A1 * | 2/2015 | Lu et al. | G02B 6/08 385/120 |

FOREIGN PATENT DOCUMENTS

EP 0 417 857 A1 * 3/1991 ............ G02B 6/06

* cited by examiner

*Primary Examiner* — Daniel Petkovsek (57) ABSTRACT

An optical component with image compensation is formed by a plurality of optical fibers arranged and connected in the same direction. A section of the optical component includes an output face, an input face, and a lateral face. The output face is formed by sections at one end of the optical fibers respectively, and each of the sections is a perfect circle or a regular polygon. The input face is formed by sections at the other end of the optical fibers respectively, and each of the sections is noncircular or is a irregular polygonal. The lateral face extends in the same direction as the optical fibers. Thereby, images shown on display devices have preset luminous intensity no matter if users are located in front of or beside the display devices.

18 Claims, 13 Drawing Sheets

OPTICAL COMPONENT WITH IMAGE COMPENSATION

BACKGROUND OF THE INVENTION

Field of the Invention

The present invention relates to an optical component and, especially, to an optical component with image compensation that includes an output face being cut vertically and an input face obtained by oblique cutting for providing uniform luminous intensity of images no matter whether users see from the front view or the side view.

Description of Related Art

Figure 13:
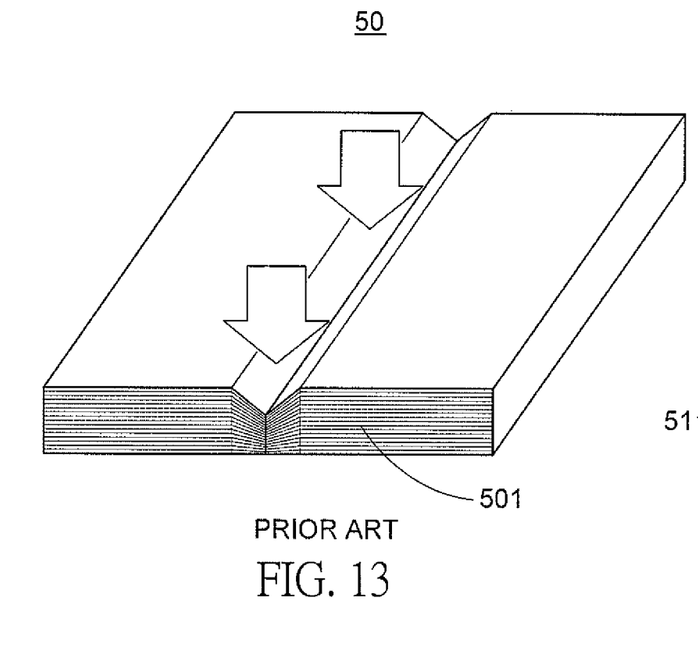
FIG. 13 is a schematic drawing showing a step during a manufacturing process of an optical component of the prior art.
Figure 14:
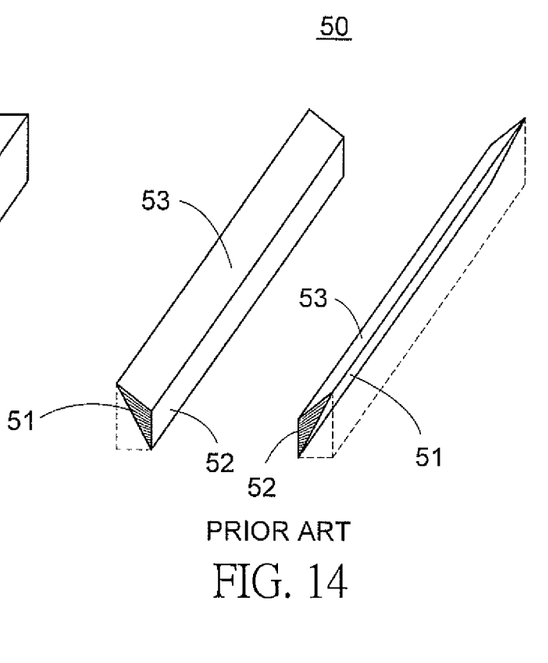
FIG. 14 is a schematic drawing showing a step during a manufacturing process of an optical component of the prior art.

Referring to FIG. 13 and FIG. 14, a conventional method for manufacturing optical components is revealed. As shown in FIG. 13, a plurality of optical fibers 501 is stacked and then pressed by a force. Then, optical components 50, each of which is a triangular prism, are obtained through cuttings, as shown in FIG. 14. The optical component 50 consists of an output face 51, an input face 52 and a lateral face 53. Both the input face 52 and the lateral face 53 are affected by the force applied. Thus, the area of radial sections of the optical fibers 501 on the input face 52 is decreased after being compressed. After being cut vertically, the sections on the input face 52 are round or polygonal and are distributed irregularly. As to the output face 51, it is formed by oblique cutting. Thus, there is an angle between sections on the output face 51 and radial sections of the optical fibers 501.

Figure 15:
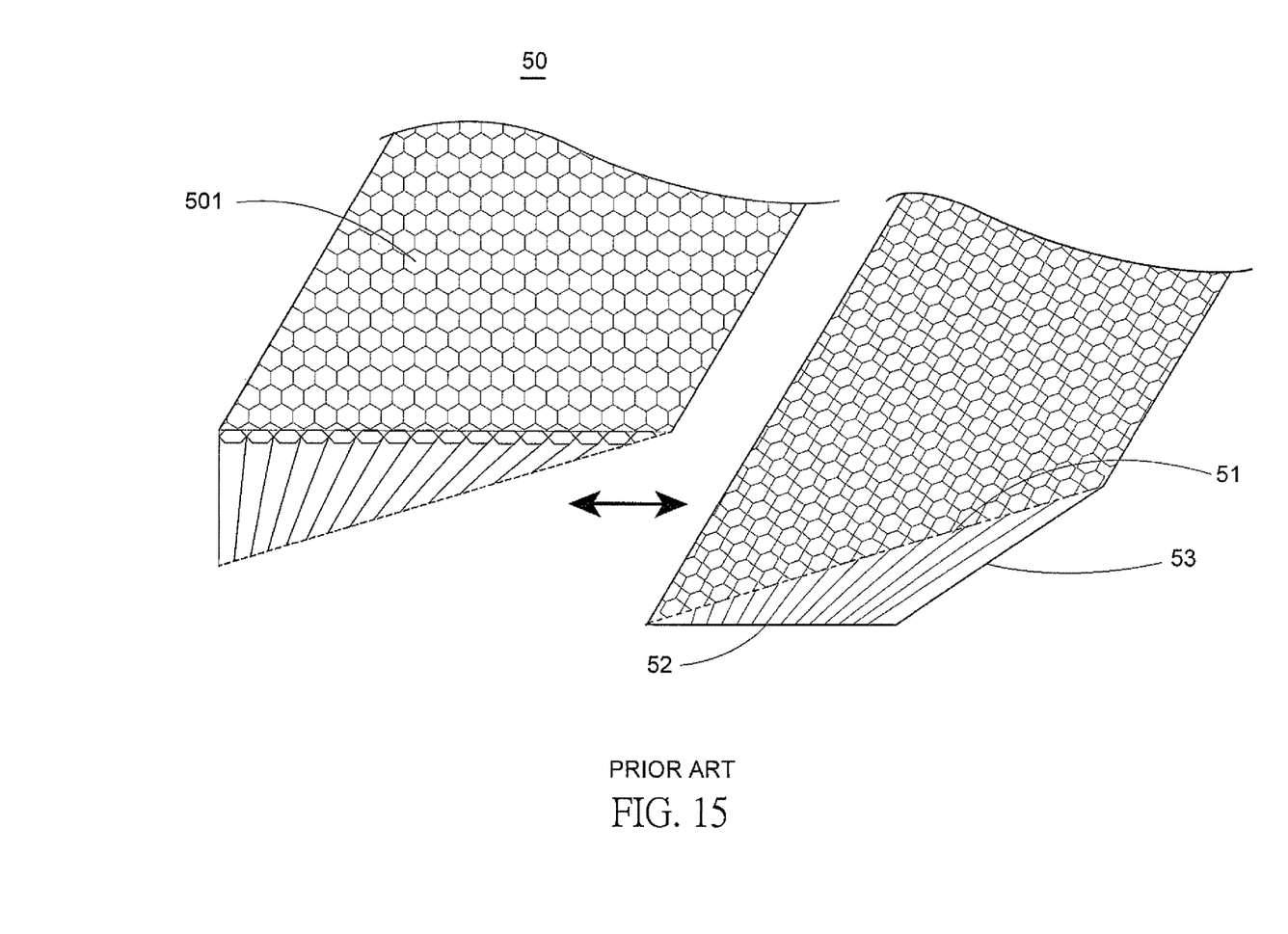
FIG. 15 is a partial enlarged view of an optical component of the prior art.

Referring to FIG. 15, it shows partial enlarged views of the optical component 50 before and after cutting. The lateral face 53 of the optical component 50 is also affected by the force applied, while the output face 51 forms the longest side of a triangular end of the optical component 50 in the form of a triangular prism after being cut obliquely. Thus, there is an angle between radial sections of the optical fibers 501 and sections of the optical fibers 501 on the output face 51. As to the input face 52, it is formed by being cut vertically.

Figure 16:
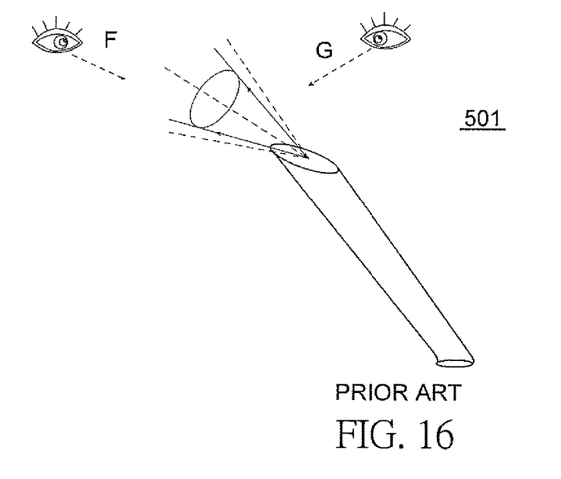
FIG. 16 is a schematic drawing showing propagation of light through the prior art.

Referring to FIG. 16, the section on a light emitting end of the optical fiber 501 is not the radial section, so that light emitted from the light emitting end is refracted and then moves forward. Thus, the light judged by the user at the point F is brighter, while the user at the point G sees darker light.

Figure 17:
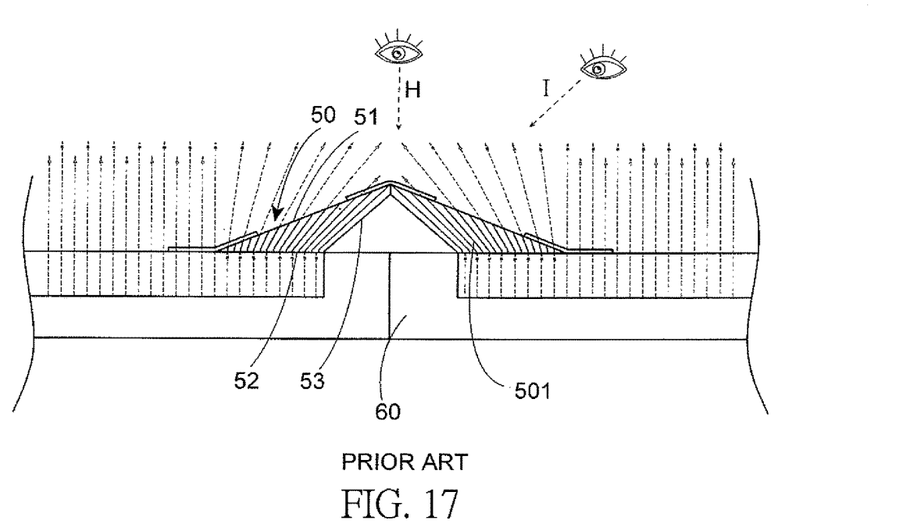
FIG. 17 is a schematic drawing showing the prior art in FIG. 16 in use.

Referring to FIG. 17, the optical components 50 are symmetrically disposed over the two connected display devices 60. The connection area on top of the optical components 50 is just above a connection between the two display devices 60. There is no gap formed on images of the display devices 60 due to refraction of the optical components 50. The image shows the preset luminous intensity and is displayed well when users see the image at the point H in FIG. 17. However, users at the point I see the connection between the two display devices 60 with lower luminous intensity, compared with what they see at the point H in front of the image. There is an obvious difference in the luminous intensity, and the image on-screen is not as good as that at the point H.

Figures 18, 19:
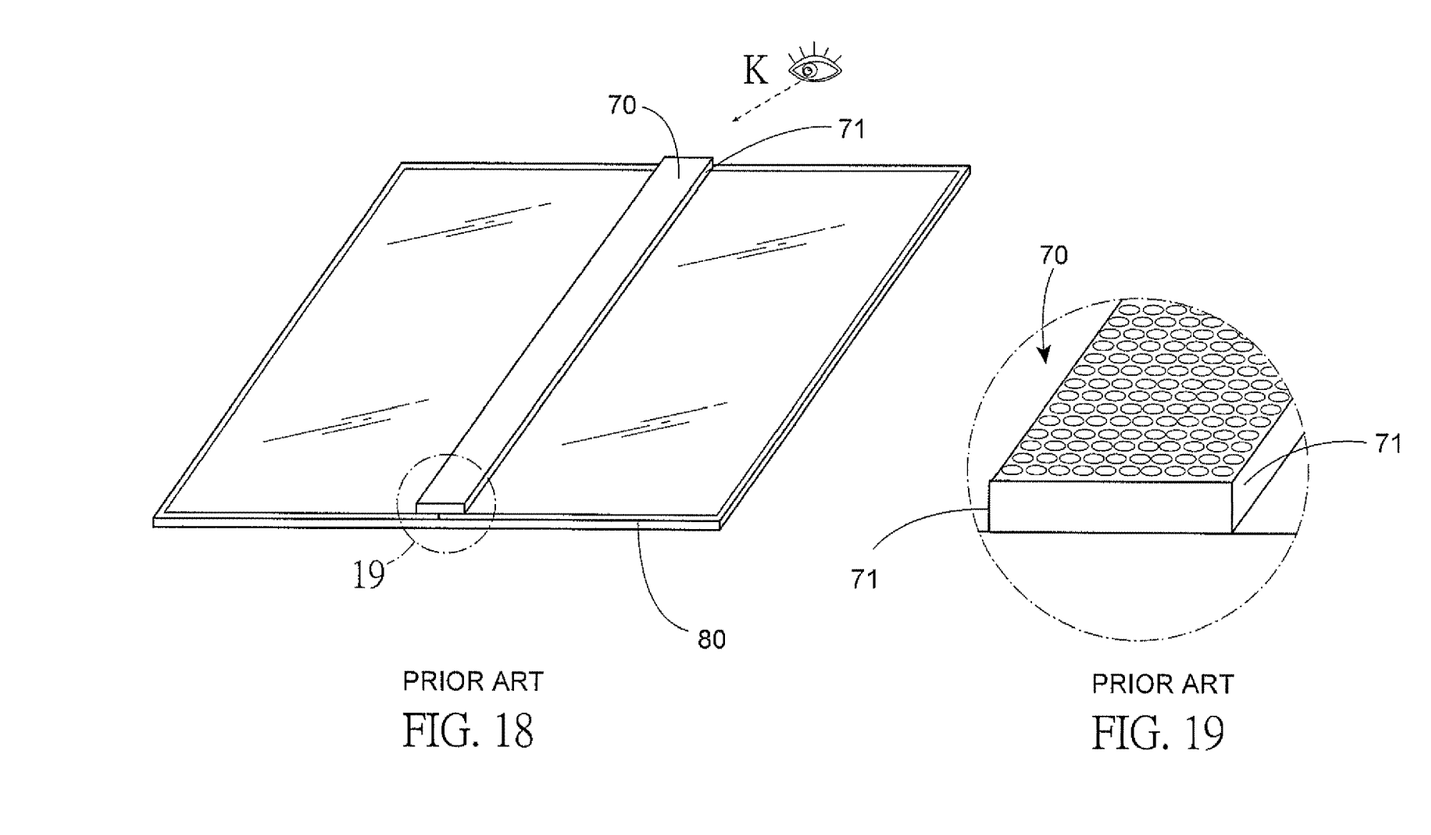
FIG. 18 is a perspective view of another prior art.
FIG. 19 is a partial enlarged view of the prior art in FIG. 18.

Referring to FIG. 18 and FIG. 19, another conventional optical component 70 is arranged at a connection area between two adjacent display devices 80. Each of two sides of the optical component 70 includes an edge 71 that is linear, and the two edges 71 are parallel to each other. Without optical fibers at these sides, users at the point K are unable to see any images.

Figure 20:
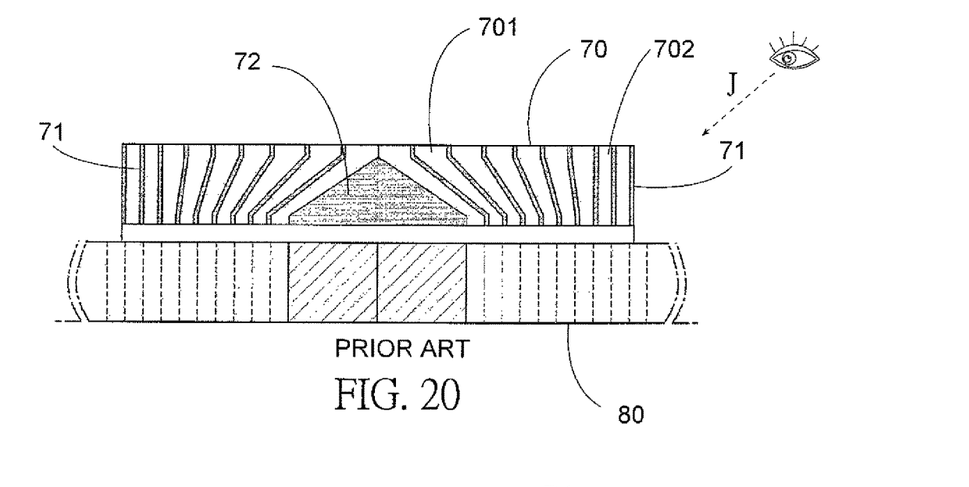
FIG. 20 is a schematic drawing showing a sectional view of the prior art in FIG. 18.

Referring to FIG. 20, a section of an optical component 70 includes a plurality of first optical fibers 701 and a plurality of second optical fibers 702. A resin support member 72 for supporting and joining the first optical fibers 701 is set on a middle part of the optical component 70. The shape of the first optical fibers 701 is similar to that of the surface of the resin support member 72, while the second optical fibers 702 are away from the resin support member 72. The user at the point J can't see the image displayed due to an edge 71 on one side of the optical component 70.

Figure 21:
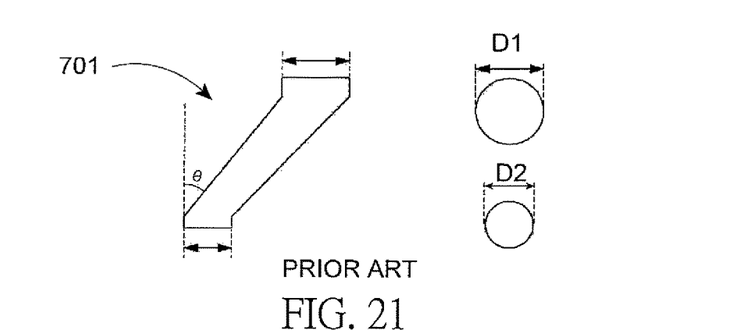
FIG. 21 is a schematic drawing showing a sectional view of a first optical fiber of the prior art in FIG. 20.
Figure 22:
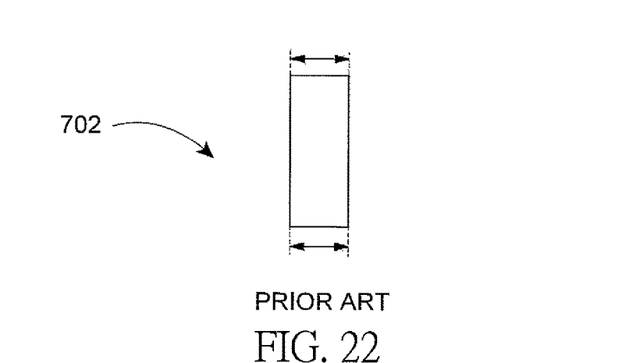
FIG. 22 is a schematic drawing showing a sectional view of a second optical fiber of the prior art in FIG. 20.
Figure 23:
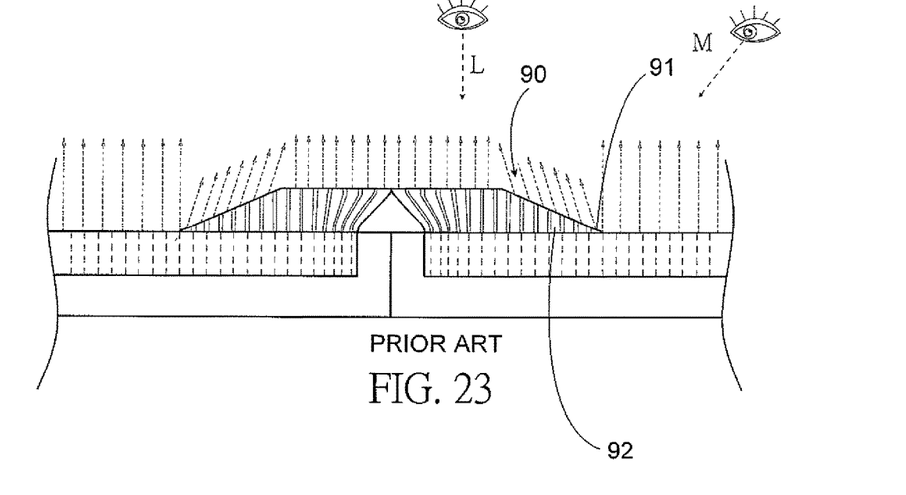
FIG. 23 is a schematic drawing showing further prior art in use.

Referring to FIG. 21, a section of the first optical fiber 701 is shown. A radial length D1 of an opening on the top of the first optical fiber 701 is longer than a radial length D2 of an opening on the bottom of the first optical fiber 701, while radial lengths D1 and D2 on the top and the bottom of the second optical fiber 702 are the same. Thus, a part of the image passed through the first optical fiber 701 is enlarged, while a part of the image passed through the second optical fiber 702 remains within the image refracted by a display device 80.

Figure 24:
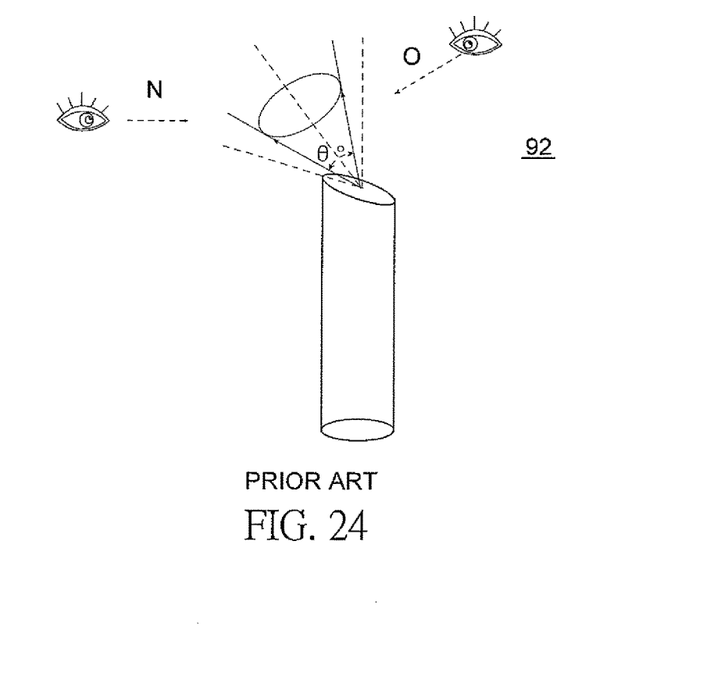
FIG. 24 is a partial enlarged view of an optical fiber in the prior art in FIG. 23.

In order to solve the problems of the image caused by the edge 71 shown in FIG. 18, a quadrilateral optical component 90 is provided. The original edge portion is cut obliquely to form a ramp 91 to solve the problem of the image that is unable to be presented before. However, a plurality of optical fibers 92 that form the ramp 91 also has the refraction problem resulting from the oblique sections of the optical fibers 92 shown in FIG. 24. Users at the point N (or point L) see the image with good luminous intensity, while the image judged at the point O (or point M) is darker. There is a difference in the luminous intensity at different positions of the image.

SUMMARY OF THE INVENTION

Therefore, it is a primary object of the present invention to provide an optical component which includes a plurality of optical fibers arranged and connected in the same direction. A section of the optical fiber includes an output face, an input face, and a lateral face. The output face is formed by sections at one end of the optical fibers respectively. Each of the sections obtained by cutting vertically is a perfect circle or a regular polygon. The area of the respective section on the output face is the same, because the sections on the output face are not affected by the force applied. The input face is formed by sections at the other end of the optical fibers. These sections correspond to the sections of the optical fibers on the output face. The area of the respective section on the input face is affected by the force applied, so that the area of the section of the respective optical fiber on the input face is decreased linearly in the direction toward the lateral face. After being cut obliquely, each of the sections is noncircular or is of an irregular polygonal. The lateral face extends in the same direction as the optical fibers. An angle formed between the input face and the lateral face is an obtuse angle, while an angle formed between the output face and the lateral face is a first acute angle. As to the angle formed between the output face and the input face, it is a second acute angle. The cutting direction of the optical component affects the direction and the shape of the sections of the optical fibers. The sections of the optical fibers on the output face are perfect circles or regular polygons respectively owing to vertical cutting, while the sections of the optical fibers on the input face are noncircular or are of an irregular polygonal because they are cut obliquely. Light emitted from optical fibers is scattered uniformly due to the perfect circular or regular polygonal sections. Thereby, images shown on the display devices have preset luminous intensity no matter whether users that see the images are standing in front of or beside the display devices.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
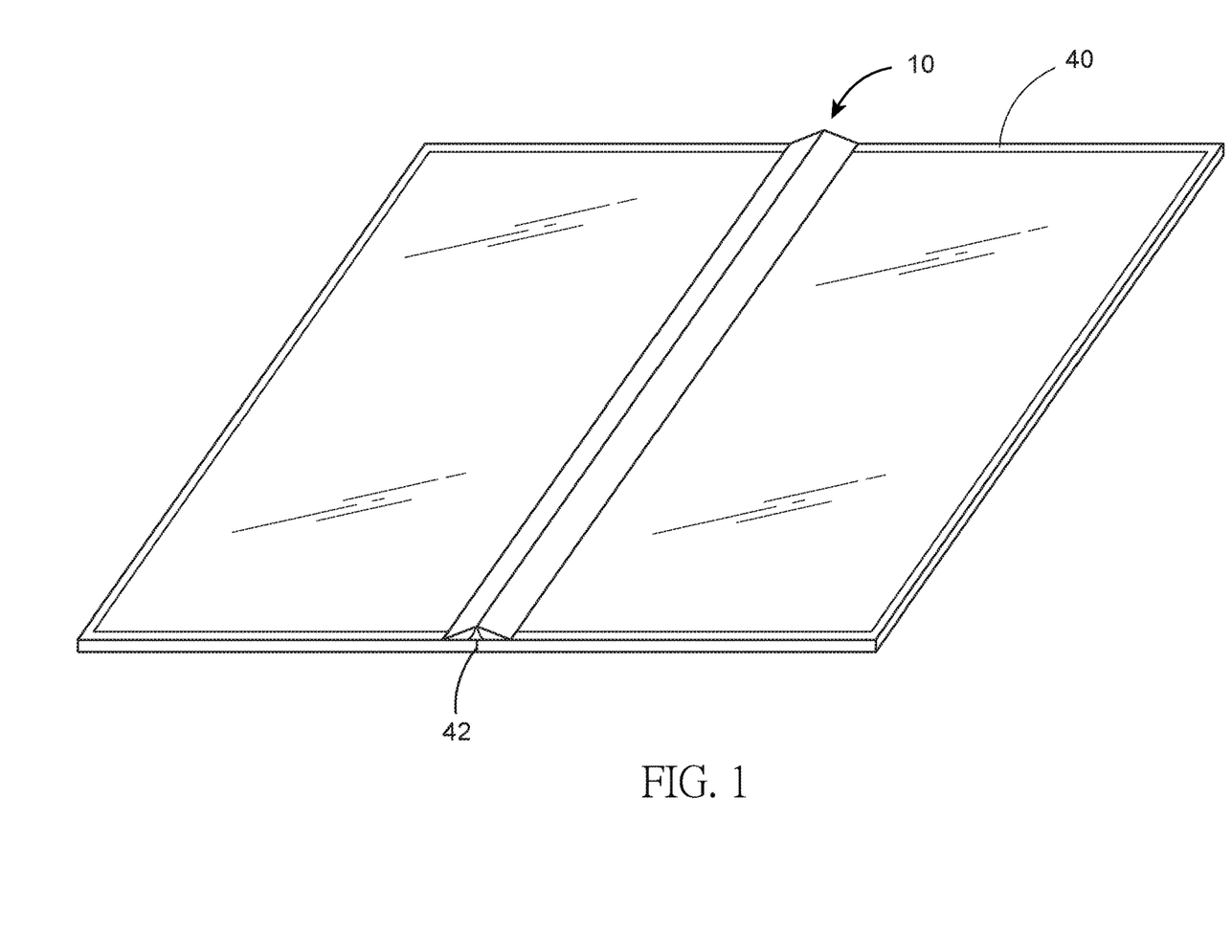
FIG. 1 is a schematic drawing showing an embodiment according to the present invention.

Refer to FIG. 1, two display devices 40 are arranged adjacent to each other, and a junction 42, where frames of the display devices 40 are joined, is a non-effective area of an image. In other words, there is a gap on the image at the position across edges of the display devices 40. Then, two optical components 10 of the present invention are disposed on and cover over a surface of the junction 42 with bilateral symmetry, so that the image shown on the display devices 40 is continuous due to the refraction of the optical components 10 on the junction 42.

Figures 2, 3, 4:
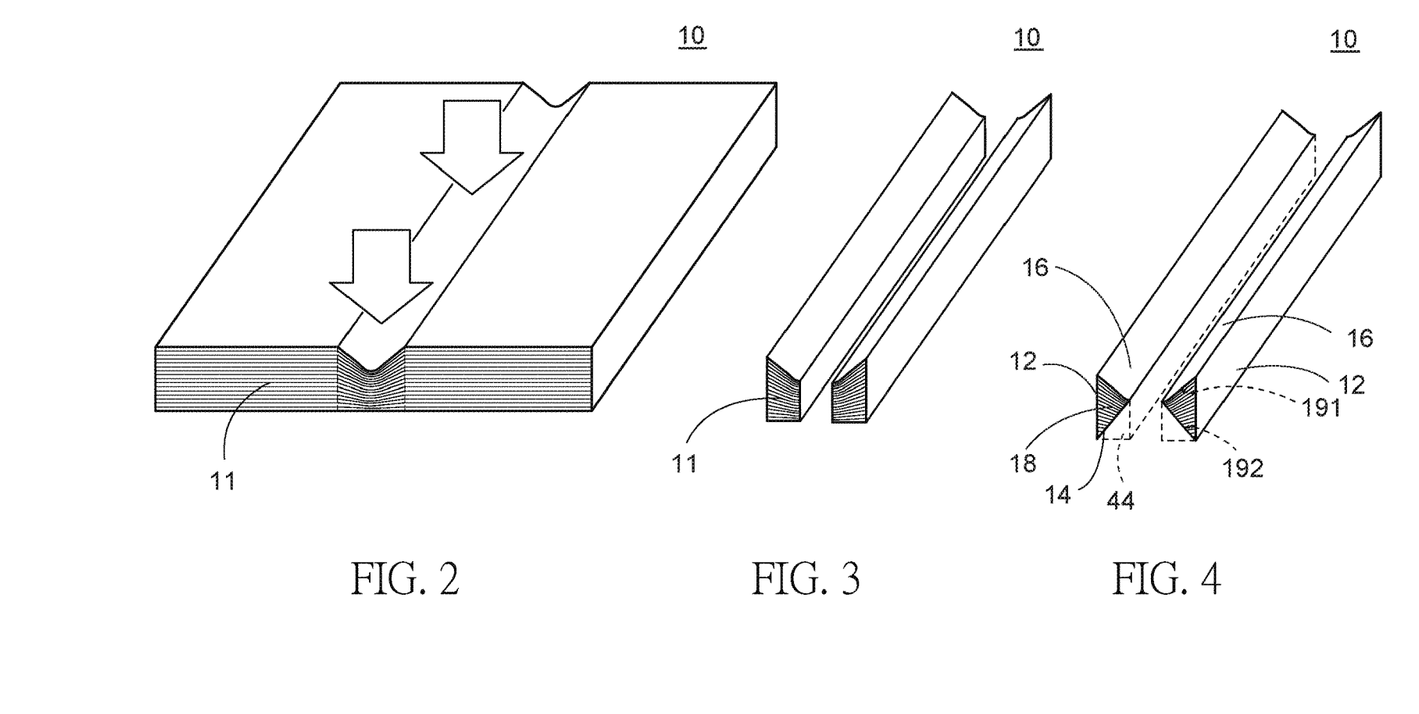
FIG. 2 is a schematic drawing showing a step during a manufacturing process of an optical component of an embodiment according to the present invention.
FIG. 3 is a schematic drawing showing another step during a manufacturing process of an optical component of an embodiment according to the present invention.
FIG. 4 is a schematic drawing showing a further step during a manufacturing process of an optical component of an embodiment according to the present invention.

Referring to FIG. 2, FIG. 3 and FIG. 4, a flowchart of a method for manufacturing the present optical component 10 is disclosed. As shown in FIG. 2, a plurality of optical fibers 11 is arranged contiguously in the same direction and is connected in bundles to form a primary product of the optical component 10. Then, a force is applied to a surface on one side of the optical component 10, and it exerts pressure on that surface to make a notch. Referring to FIG. 3, a block is formed with the notch by cutting the optical component 10. Then, cutting along the midline of the notch to the bottom of the optical component 10 results in two trapezoidal prisms each of which have a trapezoidal cross-section. Referring to FIG. 4, a triangular prism 44 is removed from the trapezoidal prism to get a final product of the optical component 10 that is a triangular prism.

Figure 5:
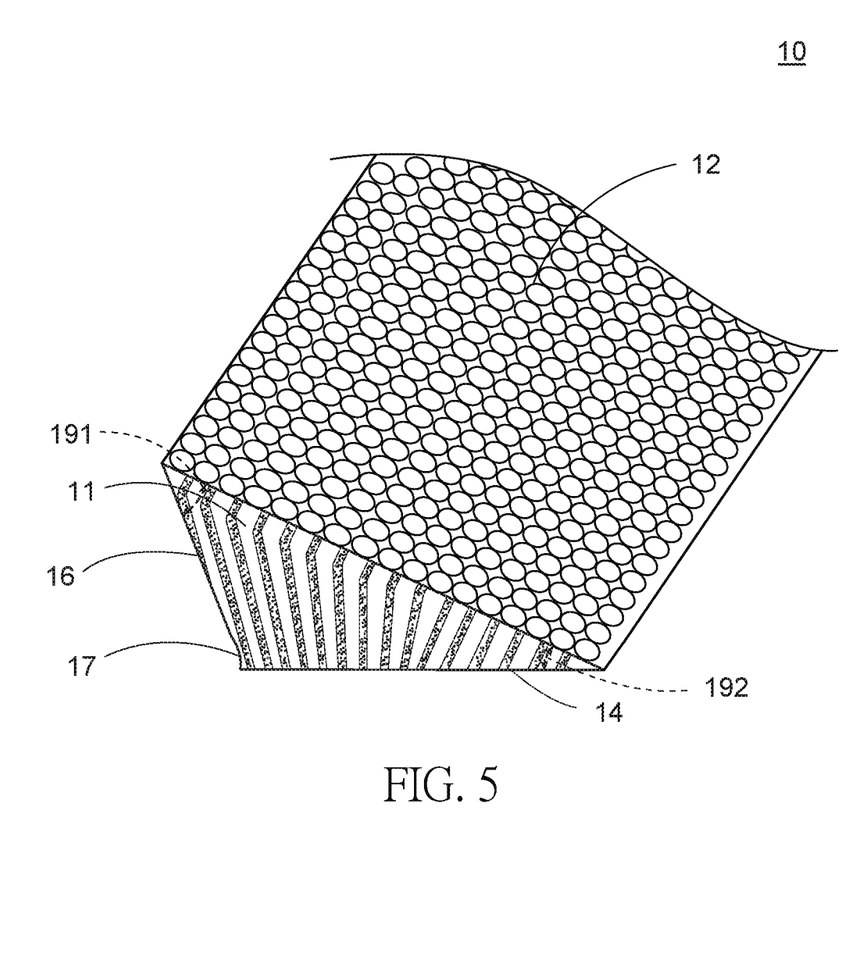
FIG. 5 is a partial enlarged view of an optical component of an embodiment according to the present invention.
Figure 6:
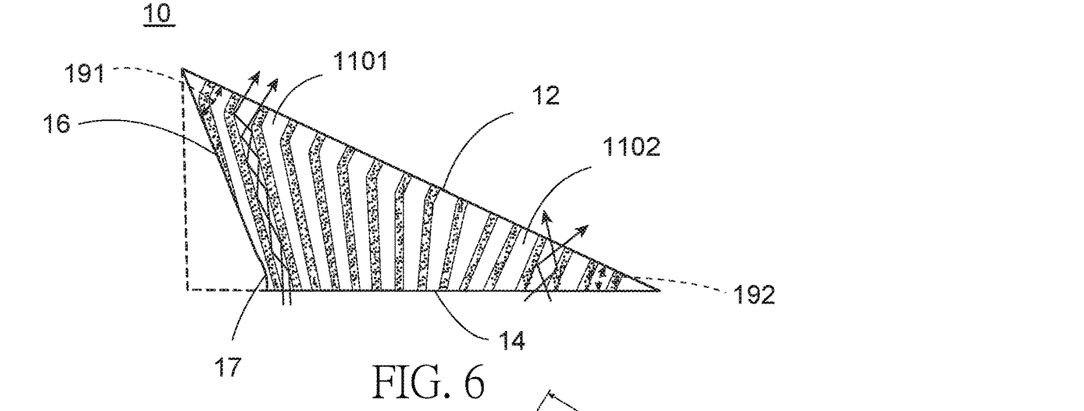
FIG. 6 is a radial sectional view of an optical component of an embodiment according to the present invention.

Referring to FIG. 4, FIG. 5, and FIG. 6, the optical component 10 is a triangular prism that includes an output face 12, an input face 14, a lateral face 16 and two connection faces 18 each of which is connected to the output face 12, the input face 14, and the lateral face 16.

Referring to FIG. 6, the optical component 10 is formed by the plurality of optical fibers 11 arranged in bundles and contiguously in the same direction. The acceptance angle/numerical aperture (the range of angles within which light that is incident on the optical fiber will be transmitted along it) of the optical fibers 11 is larger than 11.5°. The output face 12 is formed by sections at one end of the optical fibers 11 respectively, and each of the sections obtained by vertical cutting is a perfect circle or a regular polygon. Without being affected by the force applied during manufacturing, the sections of the optical fibers 11 on the output face 12 have the same area. The input face 14 is formed by sections at the other end of the optical fibers 11, and these sections correspond to those on the output face 12. During manufacturing, the area of the section on the input face 14 is affected by the pressure exerted. The area of the section of the respective optical fiber 11 on the input face 14 is decreased linearly in the direction toward the lateral face 16. The sections on the input face 14 obtained by oblique cutting are noncircular or are of an irregular polygonal. For example, the section of the optical fiber 11 on the input face 14 is not a perfect circle (close to an ellipse) due to the force applied once the section of the optical fibers 11 on the output face 12 being circular.

The lateral face 16 extends in the same direction as the optical fibers 11. An angle formed between the input face 14 and the lateral face 16 is an obtuse angle, while an angle formed between the output face 12 and the lateral face 16 is a first acute angle 191 ranging from 5 degrees to 85 degrees (5°~85°). The preferred range of the first acute angle 191 is 8°~75°. An angle formed between the output face 12 and the input face 14 is a second acute angle 192 ranging from 1°~50° while a preferred range is 3°~35°.

The section of the optical fibers 11 on the output face 12 can also be a regular polygon, while the section of the optical fibers 11 on the input face 14 corresponds to the geometric shape on the output face 12 and is an irregular polygon. For example, once the section of the optical fibers 11 on the output face 12 is a square, the section of the optical fibers 11 on the input face 14 is non-square (other quadrilaterals, except a square).

The area of the section of the respective optical fiber 11 on the input face 14 is decreased linearly in the direction toward the lateral face 16.

Figure 7:
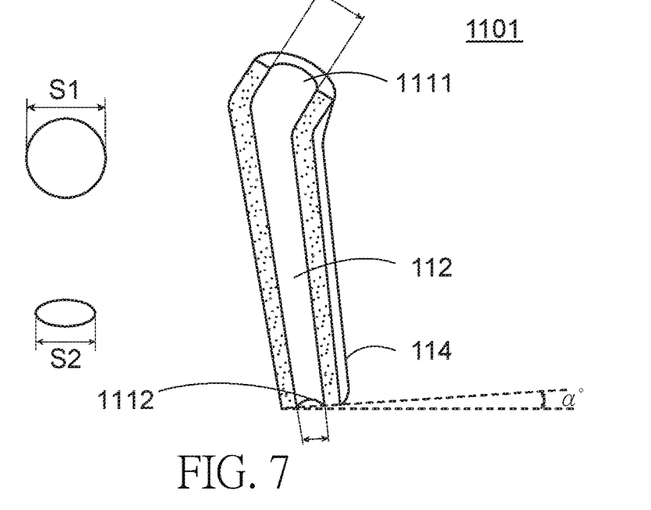
FIG. 7 is a schematic drawing showing a section of an optical fiber close to a lateral face, a length of a radial section at a light emitting end S1 of the optical fiber and a length of a radial section at a light incident end S2 of the optical fiber according to the present invention.
Figure 8:
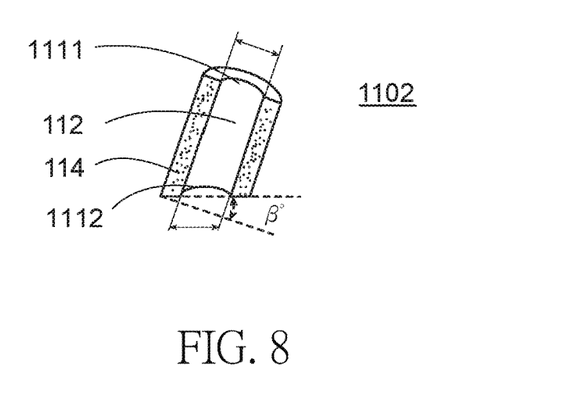
FIG. 8 is a schematic drawing showing a radial section of an optical fiber away from a lateral face of an embodiment according to the present invention.

Referring to FIG. 7 and FIG. 8, together with FIG. 6, the shape and the section angle (an angle between the radial section of the optical fiber 11 and the input face 14) of the optical fibers 11 being affected by the force applied are revealed. After being affected by the pressure exerted, two different types of optical fibers 11 are formed, including a first optical fiber 1101 and a second optical fiber 1102. The first optical fiber 1101 has a section angle α°, while the second optical fiber 1102 has a section angle β°. The value of the section angle α° and β° is decreased linearly in the direction toward the lateral face 16 and is in the range of 1°~65° with the optimal range of 3°~55°. The section angle α° is less than or equal to the section angle β°.

Referring to FIG. 6 and FIG. 7, each of the first optical fibers 1101 of the optical fibers 11 includes a light emitting end 1111 and a light incident end 1112. A plurality of the light emitting ends 1111 forms the output face 12, and a plurality of light incident ends 1112 forms the input face 14. The first optical fibers 1101 are located in the optical component 10, at the position close to the lateral face 16. The lateral face 16 is pressed directly by the pressure exerted, so that the first optical fibers 1101 adjacent thereto are deformed due to the pressure. This leads to a change in the area of the section of the first optical fiber 1101. A radial section at one end of the first optical fiber 1101 that forms a part of the output face 12 has the longest distance S1 (located at the light emitting end 1111), while a radial section at the other end thereof close to the input face 14 has the longest distance S2 (located at the light incident end 1112). The longest distance S1 is no less than the longest distance S2. The minimum value of the ratio of the longest distance of the radial section at the two light emitting and incident ends 1111, 1112 of the first optical fiber 1101 approaches 1.

Referring to FIG. 6 and FIG. 8, the second optical fibers 1102 also includes the light emitting end 1111 and the light incident end 1112. There is a greater distance between the second optical fiber 1102 and the lateral face 16, so that the second topical fiber 1102 is less affected by the pressure exerted and is rarely deformed. Thus, the light emitting end 1111 and the light incident end 1112 have the same longest distance of the radial section. The ratio of the longest distance of the radial section at the light emitting end 1111 to the longest distance of the radial section at the light incident end 1112 is 1.

Refer Referring to FIG. 7 and FIG. 8, the ratio of distances S1, S2 of the first optical fiber 1101 is no less than that of the second optical fiber 1102. Either the first optical fiber 1101 or the second optical fiber 1102 includes a core 112 and a cladding 114. The refractive index of the core 112 is higher than that of the cladding 114. The refractive index of the core 112 is 1.55~1.9, while the cladding 114 has the refractive index in the range of 1.39~1.53.

Figure 9:
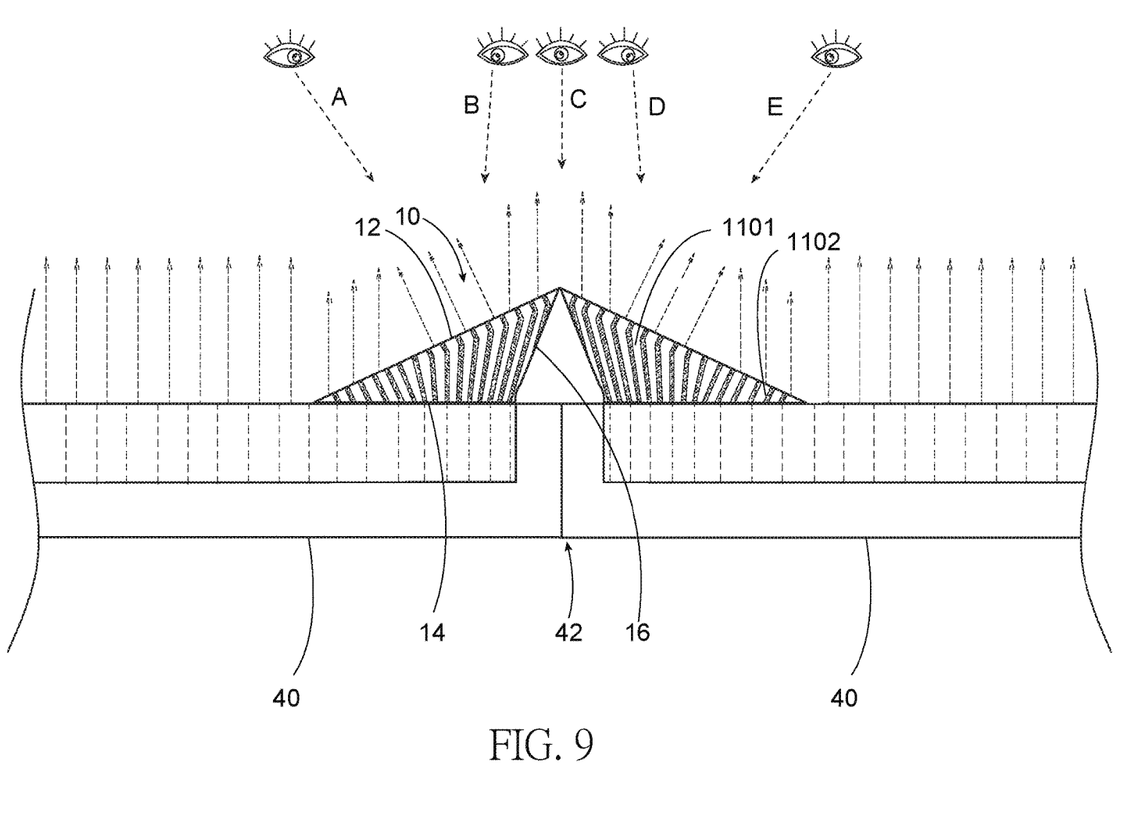
FIG. 9 is a schematic drawing showing an embodiment being applied to a flat panel display in which a thickness of a frame is equal to that of a screen according to the present invention.

Referring to FIG. 9, the junction 42 where frames of the display devices 40 are joined is a non-effective area of the image when the two display devices 40 are connected. There is a gap on the image shown on the display devices 40 at the junction 42. Thus, the optical components 10 are disposed on the surface of the display devices 40 symmetrically and respectively at the position adjacent to the junction 42. Each of the input faces 14 is attached to the corresponding display device 40 closely, the respective output faces 12 are arranged symmetrically and obliquely, and a point where two vertexes of the output faces 12 are against each other is just above the junction 42.

The light of the image goes into the optical component 10 through the input face 14 and comes out of the optical component 10 through the output face 12 when the light is emitted from the display devices 40. Now, the image refracted by the optical components 10 extends to be shown at the position over the junction 42 so that the image is continuous. At the same time, the light output moves linearly because the sections of the optical fibers 11 that form the output face 12 are vertically cut. Thus, the image displayed and seen by users has a preset luminous intensity, and no gap is generated no matter whether the users see the image at the point A (a down-right arrow pointing diagonally in a down-right/south-east direction and located on the left side of the connected display devices 40), the point B (a down-left arrow located on the left side of the connected display devices 40), the point C (a down arrow located on the front side of the connected display devices 40), the point D (a down-right arrow located on the right side of the connected display devices 40), or the point E (a down-left arrow located on the right side of the connected display devices 40).

Figures 10, 11:
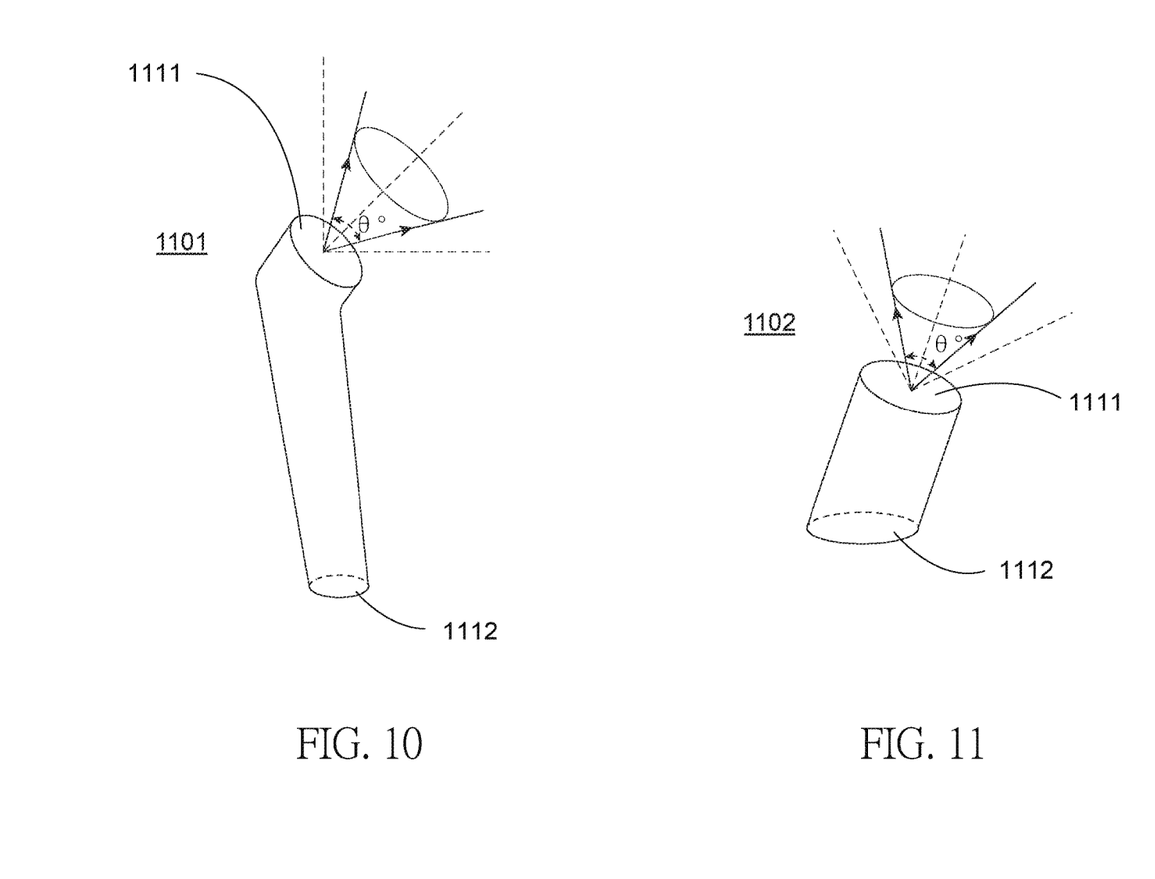
FIG. 10 is a schematic drawing showing propagation of light through a first optical fiber of the embodiment in FIG. 9 according to the present invention.
FIG. 11 is a schematic drawing showing propagation of light through a second optical fiber of the embodiment in FIG. 9 according to the present invention.

Both FIG. 10 and FIG. 11 are partial enlarged views of the embodiment in FIG. 9 showing propagation of light through the first optical fiber 1101 and the second optical fiber 1102 respectively. Light that is incident on the first optical fiber 1101 or the second optical fiber 1102 will be transmitted along the central axis thereof. The section of the first optical fiber 1101 and of the second optical fiber 1102 at the light emitting end 1111 are both circular, so that light exits the first optical fiber 1101 or the second optical fiber 1102 within the range of an acceptance angle θ (numerical aperture). The acceptance angle θ is defined as larger than 11.5°. That is to say, the light moves along the direction guided by the section of the first optical fiber 1101 and of the second optical fiber 1102 at the light emitting end 1111 after exiting the first optical fiber 1101 or the second optical fiber 1102, because the sections of the first and the second optical fibers 1101, 1102 are both perfect circles or regular polygons.

Figure 12:
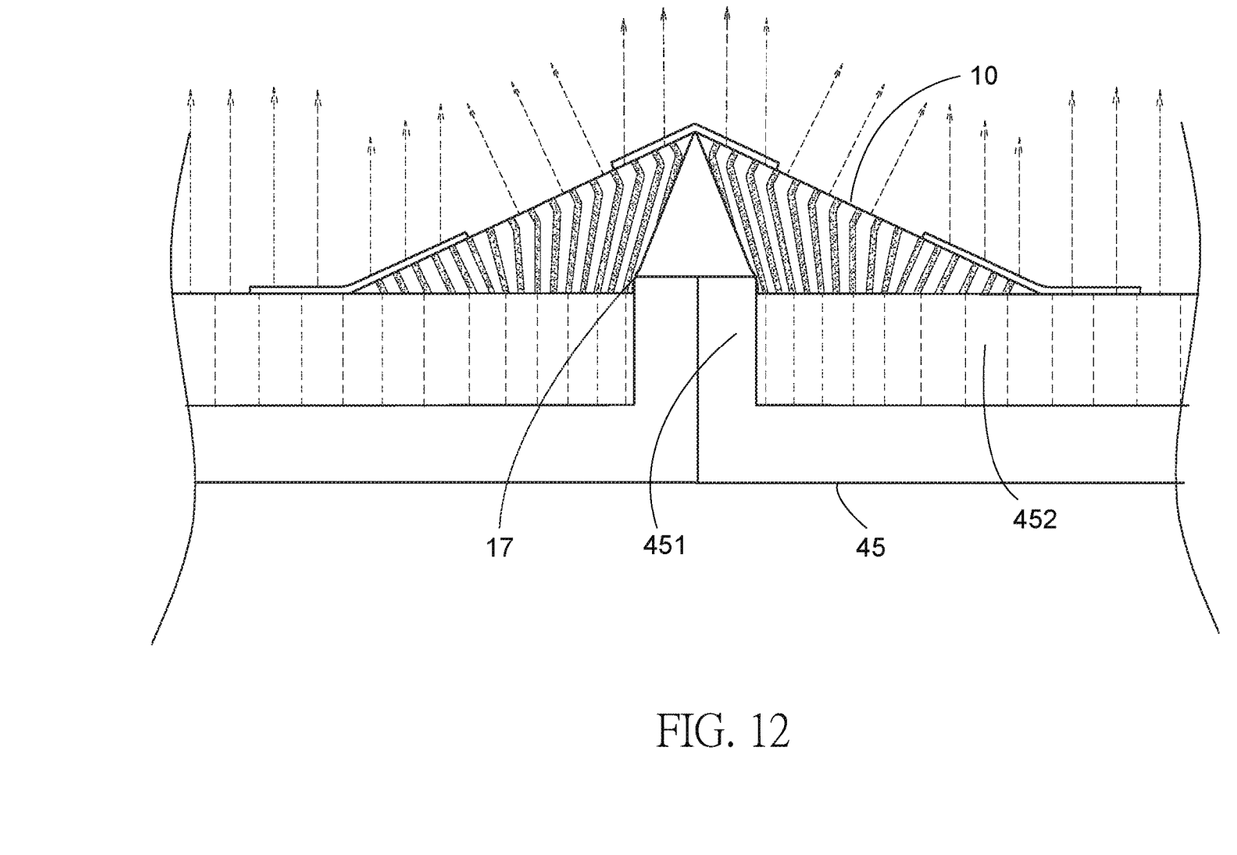
FIG. 12 is a schematic drawing showing an embodiment being applied to a display in which a thickness of a frame is larger than that of a screen according to the present invention.

Referring to FIG. 12, another embodiment of the optical components 10 in use is revealed. A leaning segment 17 used for leaning against a frame 451 is arranged at an edge of the lateral face 16 of the optical component 10, close to the output face 12. Thus, the optical component 10 can be applied to a plurality of display devices 45 in which the thickness of the frame 451 is larger than that of an image presenting structure 452.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An optical component with image compensation comprising:
   a plurality of optical fibers arranged and connected in a same direction with each of the plurality of optical fibers including a core and a cladding;
   wherein a refractive index of the core ranges from 1.55 to 1.91 and the cladding has a refractive index of 1.39~1.53; wherein an acceptance angle of the plurality of optical fibers is larger than 11.5°;
   wherein a section of the optical component includes an output face, an input face, and a lateral face; wherein the output face is formed by sections at one end of the plurality of optical fibers respectively and each of the sections obtained by cutting vertically is a perfect circle; wherein the sections on the output face have a same area because the sections on the output face are not affected by a force applied to the plurality of optical fibers; wherein the input face is formed by sections at the other end of the plurality of optical fibers while the sections are corresponding to the sections of the plurality of optical fibers on the output face; wherein an area of the sections on the input face is affected by the force applied so that the area of the sections of the optical fibers on the input face is decreased linearly in the direction toward the lateral face; wherein the sections on the input face are noncircular through oblique cutting; wherein the lateral face extends in the same direction as the plurality of optical fibers; wherein an angle formed between the input face and the lateral face is an obtuse angle while an angle formed between the output face and the lateral face is a first acute angle; and wherein an angle formed between the output face and the input face is a second acute angle.

2. The optical component as claimed in claim 1, wherein the first acute angle ranges from 5 degrees to 85 degrees (5°~85°); and wherein the second acute angle ranges from 1°~50°.

3. The optical component as claimed in claim 2, wherein the first optical angle ranges from 8° to 75°; and wherein the second optical angle ranges from 3° to 35°.

4. The optical component as claimed in claim 1, wherein a value of a section angle between a radial section and the input face is decreased linearly in the direction toward the lateral face and ranges from 1° to 65°.

5. The optical component as claimed in claim 4, wherein the value ranges from 3° to 55°.

6. The optical component as claimed in claim 1, wherein a leaning segment used for leaning against a frame of a display device is arranged at an edge of the lateral face.

7. The optical component as claimed in claim 1, wherein the plurality of optical fibers is divided into first optical fibers and second optical fibers after being squeezed by the force applied; wherein both the first and second optical fibers include a light emitting end and a light incident end; wherein a plurality of light emitting ends form the output face while a plurality of light incident ends form the input face; wherein a ratio of the longest distance of a radial section at the light emitting end to the longest distance of a radial section at the light incident end of the first optical fibers is no less than a ratio of the longest distance of a radial section at the light emitting end to the longest distance of a radial section at the light incident end of the second optical fibers; and wherein a minimum ratio of the longest distance of the radial section at the light emitting end to the longest distance of the radial section at the light incident end of the first optical fibers approaches 1.

8. The optical component as claimed in claim 1, wherein the optical component is a triangular prism after cutting and the triangular prism includes the output face, the input face, the lateral face and two connection faces each of which is connected to the output face, the input face, and the lateral face.

9. The optical component as claimed in claim 1, wherein two optical components are arranged at a junction where two display devices are connected.

10. An optical component with image compensation comprising:
    a plurality of optical fibers arranged and connected in a same direction with each of the plurality of optical fibers including a core and a cladding;
    wherein a refractive index of the core ranges from 1.55 to 1.91 and the cladding has a refractive index of 1.39~1.53; wherein an acceptance angle of the plurality of optical fibers is larger than 11.5';
    wherein a section of the optical component includes an output face, an input face, and a lateral face; wherein the output face is formed by sections at one end of the plurality of optical fibers respectively and each of the sections obtained by cutting vertically is a regular polygon; wherein the sections on the output face have a same area because the sections on the output face are not affected by a force applied to the plurality of optical fibers; wherein the input face is formed by sections at the other end of the plurality of optical fibers while the sections are corresponding to the sections of the plurality of optical fibers on the output face; wherein an area of the sections on the input face is affected by the force applied so that the area of the sections of the plurality of optical fibers on the input face is decreased linearly in the direction toward the lateral face; wherein the sections on the input face are an irregular polygonal through oblique cutting; wherein the lateral face extends in the same direction as the plurality of optical fibers; wherein an angle formed between the input face and the lateral face is an obtuse angle while an angle formed between the output face and the lateral face is a first acute angle; and wherein an angle formed between the output face and the input face is a second acute angle.

11. The optical component as claimed in claim 10, wherein the first acute angle ranges from 5 degrees to 85 degrees (5° ~85°); and wherein the second acute angle ranges from 1°~50°.

12. The optical component as claimed in claim 11, wherein the first optical angle ranges from 8° to 75°; and wherein the second optical angle ranges from 3° to 35°.

13. The optical component as claimed in claim 10, wherein a value of a section angle between a radial section and the input face is decreased linearly in the direction toward the lateral face and ranges from 1° to 65°.

14. The optical component as claimed in claim 13, wherein the value ranges from 3° to 55°.

15. The optical component as claimed in claim 10, wherein a leaning segment used for leaning against a frame of a display device is arranged at an edge of the lateral face.

16. The optical component as claimed in claim 10, wherein the plurality of optical fibers is divided into first optical fibers and second optical fibers after being squeezed by the force applied; wherein both the first and second optical fibers include a light emitting end and a light incident end; wherein a plurality of light emitting ends form the output face while a plurality of light incident ends form the input face; wherein a ratio of the longest distance of a radial section at the light emitting end to the longest distance of a radial section at the light incident end of the first optical fibers is no less than a ratio of the longest distance of a radial section at the light emitting end to the longest distance of a radial section at the light incident end of the second optical fibers; and wherein a minimum ratio of the longest distance of the radial section at the light emitting end to the longest distance of the radial section at the light incident end of the first optical fibers approaches 1.

17. The optical component as claimed in claim 10, wherein the optical component is a triangular prism after cutting and the triangular prism includes the output face, the input face, the lateral face and two connection faces each of which is connected to the output face, the input face, and the lateral face.

18. The optical component as claimed in claim 10, wherein two optical components are arranged at a junction where two display devices are connected.

* * * * *